(12) United States Patent
Benameur et al.

(10) Patent No.: US 8,527,954 B2
(45) Date of Patent: Sep. 3, 2013

(54) METHOD FOR AUTOMATICALLY CREATING A BEHAVIOR PATTERN OF A COMPUTER PROGRAM FOR MODEL-BASED TESTING TECHNIQUES

(75) Inventors: Azzedine Benameur, Caromb (FR); Paul El Khoury, Antibes (FR)

(73) Assignee: SAP AG, Walldorf (DE)

( * ) Notice: Subject to any disclaimer, the term of this patent is extended or adjusted under 35 U.S.C. 154(b) by 1227 days.

(21) Appl. No.: 12/180,016

(22) Filed: Jul. 25, 2008

(65) Prior Publication Data

US 2009/0037884 A1     Feb. 5, 2009

(30) Foreign Application Priority Data

Jul. 31, 2007   (EP) .................................... 07290961

(51) Int. Cl.
*G06F 9/44* (2006.01)
(52) U.S. Cl.
USPC ............................ 717/126; 717/111; 717/130
(58) Field of Classification Search
USPC .......................... 717/108–135; 715/708–842
See application file for complete search history.

(56) References Cited

U.S. PATENT DOCUMENTS

| 5,963,739 | A | 10/1999 | Homeier | |
|---|---|---|---|---|
| 7,356,803 | B2 * | 4/2008 | Bau et al. ........................ | 717/116 |
| 7,631,291 | B2 * | 12/2009 | Shukla et al. .................. | 717/107 |
| 7,890,484 | B1 * | 2/2011 | Hall ................................ | 707/705 |
| 2003/0204570 | A1 | 10/2003 | Rehof et al. | |
| 2005/0273757 | A1 * | 12/2005 | Anderson ...................... | 717/100 |
| 2006/0053414 | A1 * | 3/2006 | Bhandari et al. ............... | 717/133 |
| 2006/0282819 | A1 * | 12/2006 | Graham et al. ................ | 717/113 |
| 2006/0294502 | A1 * | 12/2006 | Das et al. ....................... | 717/129 |

OTHER PUBLICATIONS

Uchitel, S. and Chechik, M., Merging Partial Behavioural Models, Proceedings of FSE'04 (2004).*
Peter Amey, "Closing the Loop: The Influence of Code Analysis on Design", Reliable Software Technologies-ADA Europe International Conference 2002, Jun. 2002, pp. 151-162, XP002464718.
Jurgens J et al., "A Foundation for Tool-Supported Critical Systems Development with UML" Engineering of Computer-Based Systems, 2004. Proceedings. 11th IEEE International Conference and Workshop on the Brno, Czech Republic May 24-27, 2004, Piscataay, NJ, USA, IEEE, May 24, 2004 pp. 398-405, XP010711471.
Katayama T et al., "Proposal of a Method to Support Testing for Java Programs With UML", Software Engineering Conference, 2005. APSEC '05. 12th Asia-Pacific Taipei, Taiwan Dec. 15-17, 2005, pp. 533-540, XP010902694.

* cited by examiner

*Primary Examiner* — Wei Zhen
*Assistant Examiner* — Satish Rampuria
(74) *Attorney, Agent, or Firm* — Fish & Richardson P.C.

(57) ABSTRACT

A method is provided for creating a behavior pattern of a computer program which comprises at least one source code with a plurality of program operations which are arranged in a logical succession and the source code is provided with annotations. Each annotation is referencing to a respective program operation and the annotations are read out automatically by a modeling tool, which is running on a processing unit and generating the behavior pattern of the computer program by arranging the annotations which have been read out according to the logical succession of the program operations and providing the generated behavior pattern, so that the generated behavior pattern can be represented via a representing unit. Furthermore, an appropriate server and an appropriate network system are provided.

14 Claims, 8 Drawing Sheets

```
...
@StateChartAnnotation(id="1.1",state="Idle",previous="I
nitial",true_Next="1.2",fault_Next="2.1",true_Relation_N
ame="Coins",false_Relation_Name="Invalid")
        public void waiting()
        {...}
@StateChartAnnotation(id="1.2",state="Select",previous=
"1.1",true_Next="1.3",fault_Next="2.3",true_Relaton_Na
me="Select Coffee",false_Relation_Name="Invalid")
        public void Select(String name)
        {...}

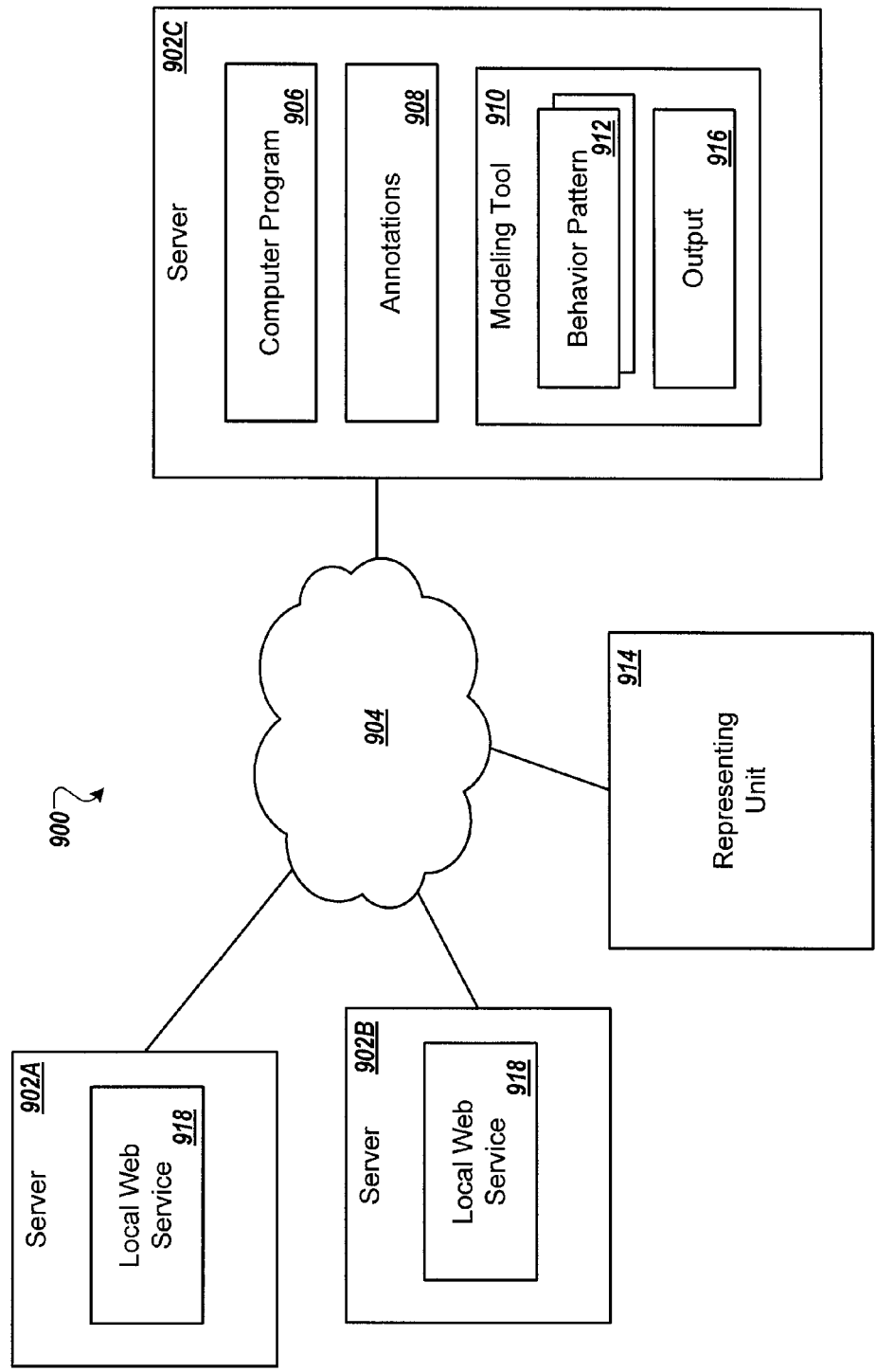

METHOD FOR AUTOMATICALLY CREATING A BEHAVIOR PATTERN OF A COMPUTER PROGRAM FOR MODEL-BASED TESTING TECHNIQUES

RELATED APPLICATION

This application claims priority from European Patent Application Serial No. EP 07290 961.7, filed Jul. 31, 2007, and entitled "Method for automatically creating a behavior pattern of a computer program for model-based testing techniques," the contents of which are incorporated herein by reference.

TECHNICAL FIELD

This description relates to a method for creating a behavior pattern of a computer program, in particular to a method for reverse engineering from a source code of a computer program to a state chart diagram, such as a UML state machine diagram.

DESCRIPTION OF THE RELATED ART

Software development is a broad area where modeling techniques and programming techniques meet. Usually, the modeling part is skipped to fulfill software development deadlines. However, the modeling part is of importance to create a model of the computer program which allows a traceability of program operations and an analysis of the computer program. Furthermore, such a model can be used for automating a testing process of the computer program via model-based testing techniques (MBT). However, an initial invest of costs and time to develop the models is necessary, as the models have to be designed manually via design software. It is often the case that also for existing computer programs no models are available, so they have to be created afterwards by using reverse-engineering tools.

Known reverse-engineering tools are generally starting with a model and converting it into a source code. Afterwards they re-convert it into a model again. Alternatively, they can start with the source code and convert it into a model. However, only static models (class diagrams) can be created, but it is not possible to model a dynamic part (state chart diagram) by using the known tools.

SUMMARY

Substantially, two different types of models are used for a reverse-engineering of existing computer programs. First, a so-called "class diagram" is used to depict the static part of a computer program. Second, a so-called "state chart diagram", also called "state diagram", shows the dynamic behavior of the computer program. Generally, state diagrams are used to describe the behavior of a system which in turn can be associated and controlled by a computer program. Therefore, a state diagram can represent a behavior pattern of such a corresponding computer program. A state diagram generally describes all possible states of a system and thus also those of an underlying computer program as events occur.

State diagrams can also be characterized in that they are used to graphically represent finite state machines as will be explained below.

Several attempts have been proposed to create a model of an existing computer program with a source code via reverse-engineering tools, which are using a class diagram, as, for example, a so-called UML (Unified Modeling Language) class diagram. Thus, there is a wide range of tools, such as "SDE", "Poseidon" or "Visual Paradigm", which analyze the existing source code and allow reverse-engineering by automatically generating a model and a set of class diagrams from the source code, such as UML class diagrams. However, none of these tools is able to create a state chart diagram, such as a UML state chart diagram, which is needed to allow an automated model-based testing (MBT). Thus, state chart diagrams have to be drawn manually using design software, such as a UML design software, but it is not possible to generate the state chart diagram automatically. As described above, the class diagrams are just describing the static part of a computer program, which comprises the available class and methods as well as their relationship. In contrast to this, a state chart diagram can be designated as a behavior pattern describing a dynamic behavior of a computer program and of the system which is controlled by the computer program. The dynamic behavior is representing the way and the orders in which the operations of the computer program will be applied. Therefore, additional information relating to the dynamic behavior has to be provided for reconstructing a corresponding state chart diagram.

In order to provide reliable software, the software has to be tested. The processes of testing and modeling are often closely connected. In both cases, a dynamic model needs to be provided. Computer programs can be modeled for example with a modeling tool called "SDL" as further described in "ITU.ITU-T Recommendation Z.100: CCITT Specification and Description Language (SDL).ITU-T, June 1994" or "UML" which is de facto the standard for visualization and evolution. The unified modeling language (UML) is widely used to create an abstraction of a system. It offers a various set of diagrams for specific purposes. In regard of model-based testing (MBT) the modeling of the behavior of the computer program and the corresponding system is focused and should be represented in the already mentioned state chart diagrams. The testing tools generally require a state chart diagram such as a UML state chart diagram or other formal models like "B notation", which is used in so-called B formal methods, which is also a way to formally describe a system. These methods are further described for example in http://en.wikipedia.org/wiki/B-Method.

Such a state chart diagram is a graphical representation of at least one so-called "finite state machine". For application of the MBT techniques the behavior of the system and the computer program has to be described in the corresponding state chart diagram as precisely as possible to avoid an ambiguous description of the system. Therefore, object constraint language (OCL) as further described in detail in "Object Constraint Language Specification, version 2.0 http://www.omg.org/technology/documents/formal/ocl.htm" can be used which formalizes the behavior of the system by specifying pre-conditions and post-conditions. OCL is used to ensure pre- and post-conditions, thus reducing ambiguity. For example, such a behavior is the consequence of an action and can describe how a state changes (over time).

In the following, general MBT concepts are briefly described. The model-based testing is a black-box testing technique and allows automatic generation of tests using appropriate models of a computer program. During these tests inputs are created and executed on the so-called "System Under Test" (SUT) which represents the corresponding system and the computer program to be tested which is running on said system. MBT is an efficient way to test software in case a model does already exist. The MBT allows an automated testing procedure to shorten schedules of software development and to improve the software quality by fully tested software. As already mentioned above, the MBT requires an existing model of the system to be tested. According to the model the expected input/output operations are generated and the tests using the MBT tools are run. Afterwards, the actual output is compared with the expected input/output and allows a quantification of the reliability of the underlying model.

In the area of software reverse-engineering, the so-called "black-box" and "white-box" techniques are generally used. The black-box approach analyses input-output dependencies of an executable class file of a computer program running on a computer system. In contrast to this, the white-box technique uses a source code of the computer program to analyze the computer program.

Re-engineering tools, which are using one of these techniques, are not usable to model a dynamic part of a computer program, namely to generate a state chart diagram since none of these tools introduces any annotations for enabling a reverse-engineering of state chart diagrams.

Therefore, it is an object to provide a method for creating a behavior pattern of a computer program which comprises at least one source code with a plurality of program operations which are arranged in a logical succession. The source code is further provided with added annotations. According to the proposed method, each annotation is referencing to a respective program operation and the annotations are read out automatically by a modeling tool, which is running on a processing unit and which automatically generates the behavior pattern of the computer program by arranging the annotations which have been read out, according to the logical succession of the program operations, and provides the generated behavior pattern, so that the generated behavior pattern can be represented via an appropriate representing unit.

In the perspective of a model-based testing (MBT) the interest lies in modeling the behavior of a computer program. In modeling the behavior of a computer program, i.e. in creating a behavior pattern of the computer program, the focus is directed to the generation of an already mentioned state chart diagram. This state chart diagram can be, for example, a UML (Unified Modeling Language) State Diagram. Generally, a state chart diagram is a graphical representation of finite state machines. To be able to apply model-based testing techniques the behavior pattern of a computer program should be as precise as possible in order to avoid an ambiguous description of an underlying system. Therefore, the so-called OCL (Object Constraint Language) can be used, which formalizes the behavior of the system by specifying pre-conditions and post-conditions.

The proposed method relies on adding annotations to the respective program operations within the source code of the computer program. This can be performed manually, for example by a developer who knows the source code and the corresponding execution path. Furthermore, the annotations can also be added automatically or semi-automatically. That means that a user can be provided with annotations which are created automatically or in any other appropriate way. The user can then accept those proposed annotations so that the accepted annotations are afterwards added to the source code appropriately. The behavior pattern of the computer program is created based on this annotated source code file. An automatic creation of appropriate annotations is possible by analyzing the source code. This can be done as follows:

Identifying the operations and parameters within the source code (syntaxic analysis)

Identifying with syntax analysis of so-called branch conditions a next true relation and a next false relation ("IF, THEN ELSE . . . ")

Giving an ID automatically by incrementing an ID for each identified

Giving a state name automatically based on the name of the identified operations.

Alternatively, a semi-automatic procedure by creating annotations is possible. In that case annotations are added with an approval or a refining of a corresponding developer. That means that each step of the creation procedure of the annotations asks the assessment of the developer.

For that purpose, the provided modeling tool automatically parses the annotations which have been added to the source code and utilizes the annotations to draw a corresponding behavior pattern. The provided modeling tool can use a user interface based, for example, on a so-called "Swing" library and render the behavior pattern for example on a canvas. Alternatively, other ways of representing the behavior pattern are possible. These can be any printing, visualizing or audio method using appropriate representation units, respectively.

The annotations are each referencing to a respective program operation and comprise definitions of states and behavior of the computer program according to the respective program operation.

Adding annotations is a way of adding metadata to the source code. Those metadata are different to widely known tags, because the annotations can be available at runtime of the computer program. According to the present approach the annotations are read out automatically by the modeling tool, which automatically generates the behavior pattern based on those annotations. Thus, the behavior pattern (model) is implicitly integrated in the source code via the annotations in a non-visualized text form.

The annotations comprising the metadata can be used at method level with multiple values. Methods are operations in a computer program. This means that each operation of the source code can be annotated by adding a plurality of values to the respective operation (method) within the source code, such as id numbers or state names. Thus, the annotations will be retained during execution of the computer program, so that they are available at runtime. In this way, the model can be animated in real time for indicating the respective state within the model according to the execution of the computer program. Therefore, the execution call has to be traced at the core of a programming language, such as at a JAVA Virtual Machine (JVM), for recognizing when an operation is executed. Generally spoken, a model animation is a way to link the model with its execution so that it can be seen in which state the model is according to the execution of the computer program.

According to another aspect, at least a part of the logical succession corresponds to a chronological succession.

Thus, the source code comprises program operations which are defined to be performed in a chronological succession. Accordingly, the respective annotations of the respective program operations are correspondingly arranged in a chronological succession within the behavior pattern to be created.

Alternatively, program operations can be linked with each other in any other possible logical arrangement, which is afterwards correspondingly reflected in the behavior pattern.

According to another aspect, at least one source code is a JAVA source code.

As the method is based on adding annotations to the source code of the computer program, the ability to provide annotations is one major requirement for the programming language of the source code. For example the popular JAVA language provides annotations since its version JAVA 5.0 (so-called "Tiger"). However, any other programming language which provides the possibility to provide annotations to a source code is usable. In any case, the modeling tool has to be adapted to read out the annotations automatically and to handle the respective programming language of the source code, accordingly.

According to another aspect, the behavior pattern is a so-called finite state machine.

Such finite state machines are widely known in software development and they are representing as further described in "Wikipedia" a model of behavior comprising a finite number of states, transitions between those states and actions. A state can comprise information about at least one preceding event. A state can store information about the past, i.e. it can reflect input changes from the system start to the present moment. An action is a description of an activity which has to be performed in a given moment. A transition describes a state change and depends on a condition which has to be fulfilled to enable the transition.

The logical concept of a finite state machine describes a following state (within a sequence of states) and an output of a finite state machine as a function of a specific input and a current state. Finite state machines are defined as tuples ($\Sigma$, $\Gamma$, S, $\delta$, ... ), wherein:

1. $\Sigma$ represents a set of possible inputs,
2. $\Gamma$ is a set of possible outputs,
3. S is a non-empty set of states,
4. $\delta$ is a state transition function: $\delta = S \times \Sigma \rightarrow S$ According to a possible embodiment, the generated behavior pattern is a dynamic state chart diagram, such as a Unified Modeling Language (UML) state chart diagram.

The state chart diagram is used for a graphical representation of the described finite state machines and it represents the dynamical behavior of the corresponding computer program and thus the dynamical behavior of a system the computer program is controlling. For example, such a state chart diagram can be a UML state chart diagram.

Using annotations within the source code allows a description of the finite state machine(s) at code level. In order to visualize the states in the state chart diagram, the states can be defined for example with at least seven parameters (elements):

1. Identifier
2. State name
3. Previous State
4. Next A state if condition ok
5. Next B state if condition ok
6. Name for Next A
7. Name for Next B According to the parameters, which are described above, the annotations can be declared for example as follows (using JAVA programming language):

```
@Retention(RetentionPolicy.RUNTIME)
@Target(ElementType.METHOD)
public @interface StateChartAnnotation {
    String id( );
    String state( );
    String previous( );
    String true_Next( );
    String fault_Next( );
    String true_Relation_Name( );
    String false_Relation_Name( );
}
```

According to another aspect, the generated behavior pattern is suitable for analyzing and testing of the corresponding computer program or usable for model-based-testing methods (MBT), because the MBT relies on the behavior of the system under test.

As the method allows the creation of a behavior pattern (model), such as a state chart diagram, which describes the dynamic behavior of the corresponding computer program, the created model can be used in the perspective of automatically testing and analyzing via the model-based testing tools (MBT). In particular, the modeling tool enables a reverse-engineering of the state chart diagram directly from the source code which is extended by added annotations. The step of adding the annotations to the source code for creating an annotated source code file is not as time-consuming as creating the whole design according to the classical graphical way such as for example in UML via industry tools. Therefore, the described method reduces time and costs for developing a behavior pattern. As the creation of the behavior pattern is based on the source code (white-box) and the testing via model-based testing tools is based on a black-box testing, the technique of re-engineering proposed herein can be classified as "grey" re-engineering.

According to another aspect, the computer program can be a web service comprising at least one source code with a plurality of web service operations which are arranged in a logical succession. The source code is provided with added annotations. Each annotation is referencing to a respective web service operation. According to the proposed method the annotations are read out automatically by a modeling tool, which is running on a processing unit, generating the behavior pattern of the web service by arranging the annotations which have been read out according to the logical succession of the web service operations and providing the generated behavior pattern so that the generated behavior pattern can be represented via an appropriate representing unit.

For example, web services can describe their interfaces by so-called "Web Service Description Language" (WSDL) files. The WSDL files are "Extensible Markup Language"-(XML)-based documents, which describe how to communicate with the corresponding web service and describe the web services as a set of abstract endpoints or ports for exchanging information. More information about web services and their respective descriptions can be found for example in http://en.wikipedia.org/wiki/Web:service. WSDL files support data types such as an XML schema and they can be extended via extensibility elements. These elements can be annotations added to a source code as described above. By using the modeling tool a behavior pattern can be weaved into a WSDL file. Thus, the behavior pattern is embedded in the corresponding web service and a model-based testing of the web service is enabled.

The XML schema, as further described for example in http://en.wikipedia.org/wiki/XML_Schema, can be used for representing data by means of XML grammar and rules for structuring a data file which contains the annotations. An example of such a possible XML schema file is depicted as follows:

```
<?xml version= "1.0" encoding="UTF-8"?>
<schemaxmlns=http://www.w3.org/2001/XMLSchema
targetNamespace="http://MBT/JavaAnnotation.sxd">
<element name="Annotation">
<complex Type>
<complexContent>
<attribute name="id" type="string" />
<attribute name="methodName" type="string" />
<attribute name="status" type="string" />
```

-continued

```
<attribute name="previous" type="string" />
<attribute name="true_Next" type="string" />
<attribute name="fault_Next" type="string" />
<attribute name="true_Relation_Name" type="string"/>
<attribute name="false_Relation_Name" type="string"/>
</complexContent>
</complexType>
</element>
</schema>
```

The schema file can also comprise the method name that can be used further to map the content of the data file with the WDSL file.

The described schema structures the data file which can be arranged for example as follows:

```
<?xml version= "1.0"?>
<DATA>
<annotation id="1.1">
<methodName><![CDATA[UserNameAndPasswordObtained
]]></methodName>
<status><![CDATA[UserNameAndPasswordObtained]
]></status>
<previous><![CDATA[initial]]></previous>
<true_Next><![CDATA[1.2]]></true_Next>
<fault_Next><![CDATA[ ]]></fault_Next>
    <true_Relation_Name><![CDATA[enterNameAndPassword(n,
    pswd)/saveCurrentUser(n,pswd)]]></true_Relation_Name>
<false_Relation_Name><![CDATA[ ]]></false_Relation_Name>
</annotation>
</DATA>
```

The content of the XML data file can be used to reconstruct the model. In the example described above XML uses UTF-8 by default, so the command CDATA is used to represent all characters.

For a possible mapping the XML schema is to be referenced into the WSDL file by the corresponding XML name space.

The annotations are embedded within the web service description and directly associated with web service operations of the web service. The WDSL file is extended by using the reference of URI (Uniform Resource Identifier) which is further described in http://www.w3.org/TR/wsdl#language, chapter 2.1.3. First of all, the name space of the XML schema is imported and then all annotations are added into the WDSL file. A WDSL file comprising annotations can be arranged as follows:

```
<wsdl:operation
name="UserNameAndPasswordObtained">
<wsdl:input
message="impl:UserNameAndPasswordObtainedRequest"
name="UserNameAndPasswordObtainedRequest"/>
<wsdl:output
message="impl:UserNameAndPasswordObtainedResponse"
name="UserNameAndPasswordObtainedResponse"/>
<Ap:Annotation id="1.1"/>
</wsdl:operation>
```

According to another aspect, it is proposed to merge annotations with a web service file, such as a WDSL file in order to create a web service file, such as a WDSL file with annotations. For that purpose, a source code file has to be prepared in two separate ways. According to one way annotations are added to the original source code file to create an annotated source code file. In a second way the original source code file is transformed into a web service file, such as a WSDL file. The web service file, as for example the WDSL file is merged with the annotated source code file to create an annotated web service file, as for example an annotated WSDL file. Thus, the model is implicitly embedded within the web service file, such as the WSDL file. For the merging of both files an appropriate merging tool is used. Afterwards, the annotated web service file, as for example the annotated WSDL file is utilized by the modeling tool to create a corresponding behavior pattern of the underlying web service.

According to another aspect, the web service provides a decentralized structure with a plurality of local web services, and the at least one modeling tool is generating at least one behavior pattern of a respective local web service of the plurality of local web services.

According to another aspect, the at least one modeling tool is generating a superior behavior pattern utilizing behavior patterns of the plurality of local web services.

The generation of a superior behavior pattern by utilizing the behavior patterns of the local web services, respectively, allows improving the security of composite web services. As the behavior pattern of each local web service is implicitly embedded in the source code of the respective local web service it can be integrated in a superior source code of a superior web service which utilizes the respective source codes of the local web services. Thus, a superior behavior pattern can be created which is depicting the superior web service. Such a fusion can be performed using model fusion techniques or other appropriate techniques.

The superior behavior pattern of the superior web service also allows analyzing functional aspects such as conformance testing and the security of the superior web service. Therefore, it represents the security behavior of the superior web service. In this way a security analysis is not limited on local attacks but also distributed attacks can be detected or predicted. Thus, higher security can be offered to detect more security breaches or attacks. A prediction of distributed attacks is not possible by using a local behavior pattern.

On the other hand, the embedded behavior pattern (model) within the WSDL file also provides the security behavior of the local web service to a testing tool which can be used to check the correct security behavior of the system and the local web service. This option is independent of the superior web service, as it is embedded in the local web service and therefore, the test can be performed offline without a connection to the superior web service.

Furthermore, the behavior pattern of the local/superior web service allows collecting traces of a running web service to verify, if the security behavior of the system is the same as the one being defined by the annotations. By this way attacks on the running system can be detected by animating the model and comparing the behavior of the running system and the behavior of the model.

Furthermore, a server is provided for carrying out a method for creating a behavior pattern of a computer program, which comprises at least one source code with a plurality of program operations which are arranged in a logical succession. The source code is provided with added annotations. Each annotation is referencing to a respective program operation. The annotations are read out automatically by a modeling tool which is running on a processing unit of the server and which generates the behavior pattern of the computer program by arranging the read out annotations according to the logical succession of the program operations and provides the generated behavior pattern, so that the generated behavior pattern can be represented via a representing unit.

The server comprises at least one processing unit configured to provide the source code of the computer program and to run the modeling tool for generating the behavior pattern. Furthermore, the server comprises means which are adapted to provide the generated behavior pattern to an appropriate representation unit.

It is also possible that the server comprises such an appropriate representation unit. Furthermore, it is possible, that the server comprises at least two separate processing units, one of which provides the source code of the computer program, the other one is operative to run the modeling tool.

Furthermore, a network system is provided for carrying out the method for creating a behavior pattern according to the present description. The network system comprises at least one modeling tool, and a plurality of servers of which at least a number of servers is connected among each other by networking means. Each server of the number of servers is configured to provide a local web service and the at least one modeling tool is provided by the network system for generating behavior patterns of the respective local web services of the respective servers according to the method for creating a behavior pattern as described before.

According to another aspect, the at least one modeling tool generates a superior behavior pattern utilizing or assembling the generated behavior patterns of the respective local web services of the respective servers.

It is possible to provide one or more modeling tools which access the respective servers, respectively, via the network system to generate a behavior pattern, also respectively. Alternatively, it is possible that the local servers comprise their own modeling tool, respectively, to perform the generation of the behavior pattern locally without a need for being connected to the network system.

The present description also covers a computer program product comprising a computer program with program coding means which are suitable for carrying out a method as described above when the computer program is running on a computer. Furthermore, a computer-readable medium is claimed with a computer program stored thereon, the computer program comprising program coding means which are suitable for carrying out a method as described above when the computer program is running on a computer.

Further features and embodiments will become apparent from the description and the accompanying drawings.

It will be understood that the features mentioned above and those described hereinafter can be used not only in the combination specified but also in other combinations or on their own, without departing from the scope of the present disclosure.

Various implementations are schematically illustrated in the drawings by means of an embodiment by way of example and are hereinafter explained in detail with reference to the drawings. It is to be understood that the description is in no way limiting on the scope of the present disclosure and is merely an illustration of an embodiment.

BRIEF DESCRIPTION OF THE DRAWINGS

In the drawings,

FIG. 8 is an extract of a source code being provided with annotations.

FIG. 9 is a schematic diagram showing an example of computer systems.

DETAILED DESCRIPTION

Figure 1:
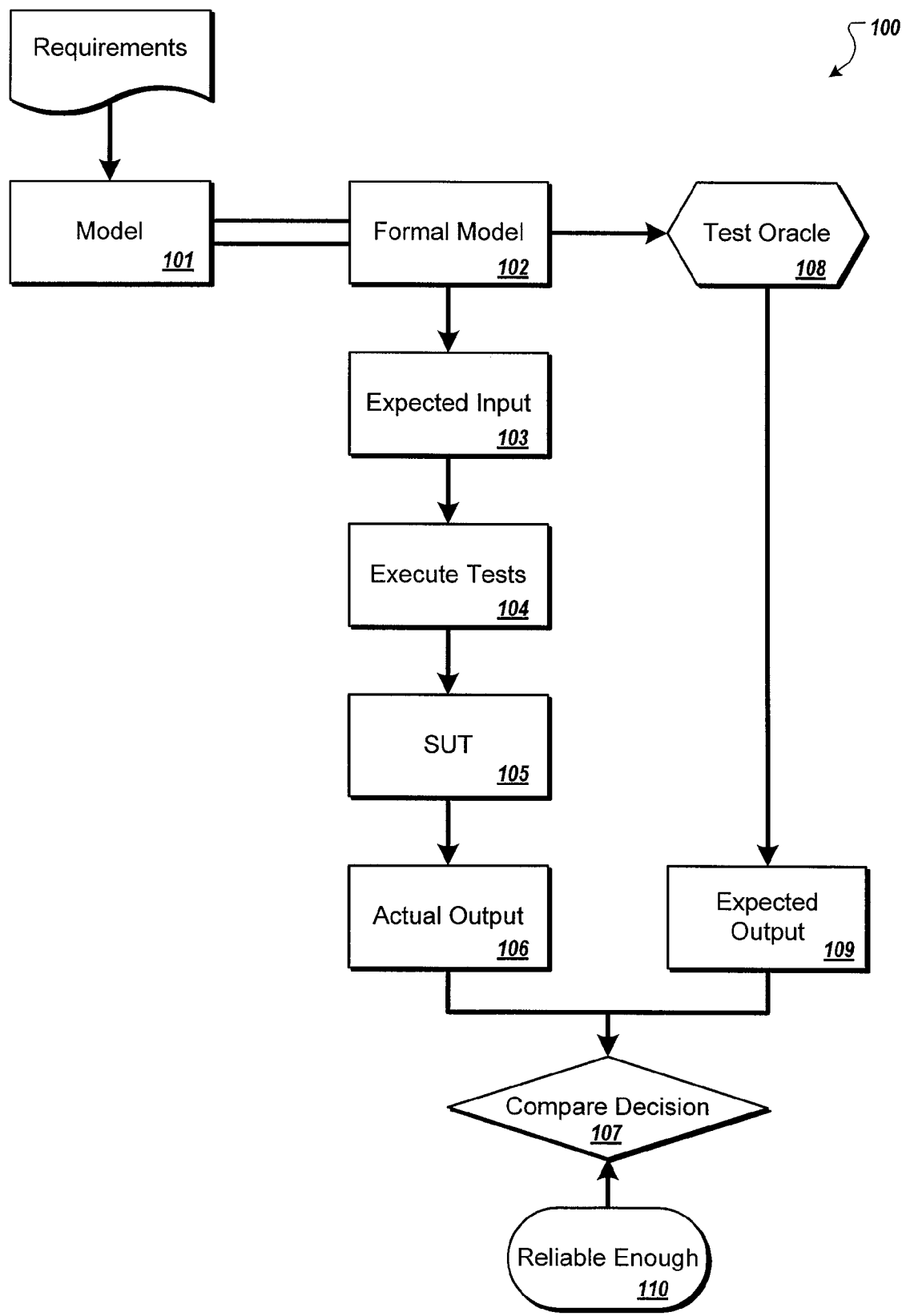
FIG. 1 is a schematic diagram of the model-based testing technique (MBT).

FIG. 1 shows a schematic diagram of the model-based testing technique (MBT) which is a black-box testing technique. Using the model-based testing technique, a model 101 of a computer program representing a corresponding system is transferred into a formal model 102 used to design the system to be tested by means of one or more tests. Therein, the model 101 is a model, which is designed in a graphical way (containing boxes and text) and the formal model 102 is usable for processing purposes and contains for example a finite state machine. Afterwards the expected input 103 for the tests to be performed is defined, generated and provided. Furthermore, a test oracle 108 is generated which specifies a source of expected results and an expected output 109 is defined therefrom. Generally speaking, a test oracle is a mechanism that verifies that a corresponding application (here the underlying computer program) has behaved correctly. One of the great benefits of model-based testing is the ability to create a test oracle from a corresponding state model. The tests 104 are executed and the system is called "System under Test" or "SUT" 105 as long as the tests are running on the system. An actual output 106 of the system is compared with the expected output 109 and a decision 107 is made whether the underlying model is reliable enough 110 or not. In case the model is not reliable, the model 101 or the computer program the model is based on has to be amended, accordingly.

Generally, the MBT-technique can be described in the following five steps:
  Design the model to be tested
  Generate the expected Input/Output
  Run tests using MBT tools
  Compare the actual output with the expected output in step 2
  Decision: is the model reliable? More tests? Etc.

Generally, model-driven or model-based testing relies on the use of a UML mechanism called UML Profile. Since UML 2.0 this profile allows to make extension using stereotypes, tags, constraints, etc. A standardized extension is U2TP (UML 2.0 Testing Profile). This extension includes different concepts, such as: Test Architecture, Test Data, Test Behavior, Test Time. That, however, consequently implies that previously known re-engineering tools which have been mentioned in the introductory part of the present disclosure and which allow a transfer from a Java source code to a UML Class diagram cannot be used. In contrary thereto, the reverse engineering approach described in the present disclosure can be used in this case.

In the following a definition of a test behavior for Model-Driven testing using U2TP is given:

A test objective defines the aim of a test. Therefore, UML Interaction Diagrams, such as State Machines and Activity Diagrams can be used to define test stimuli, observations, test control/invocations, coordination and actions. Normative test behavior is specified in a test case, which is an operation of the test context specifying how a set of co-operating components interact with the SUT to realize a test objective. When the normative test behavior is defined, focus is given to the definition of unexpected behaviors which is achieved through specification of defaults. A validation action is performed by a local test component to inform the arbiter about its local test verdict. A test verdict shows the result of the executed test. Possible test verdicts are pass, inconclusive, fail, and error. Therefore, dynamic behavior patterns as state chart diagrams are necessary.

Figure 2:
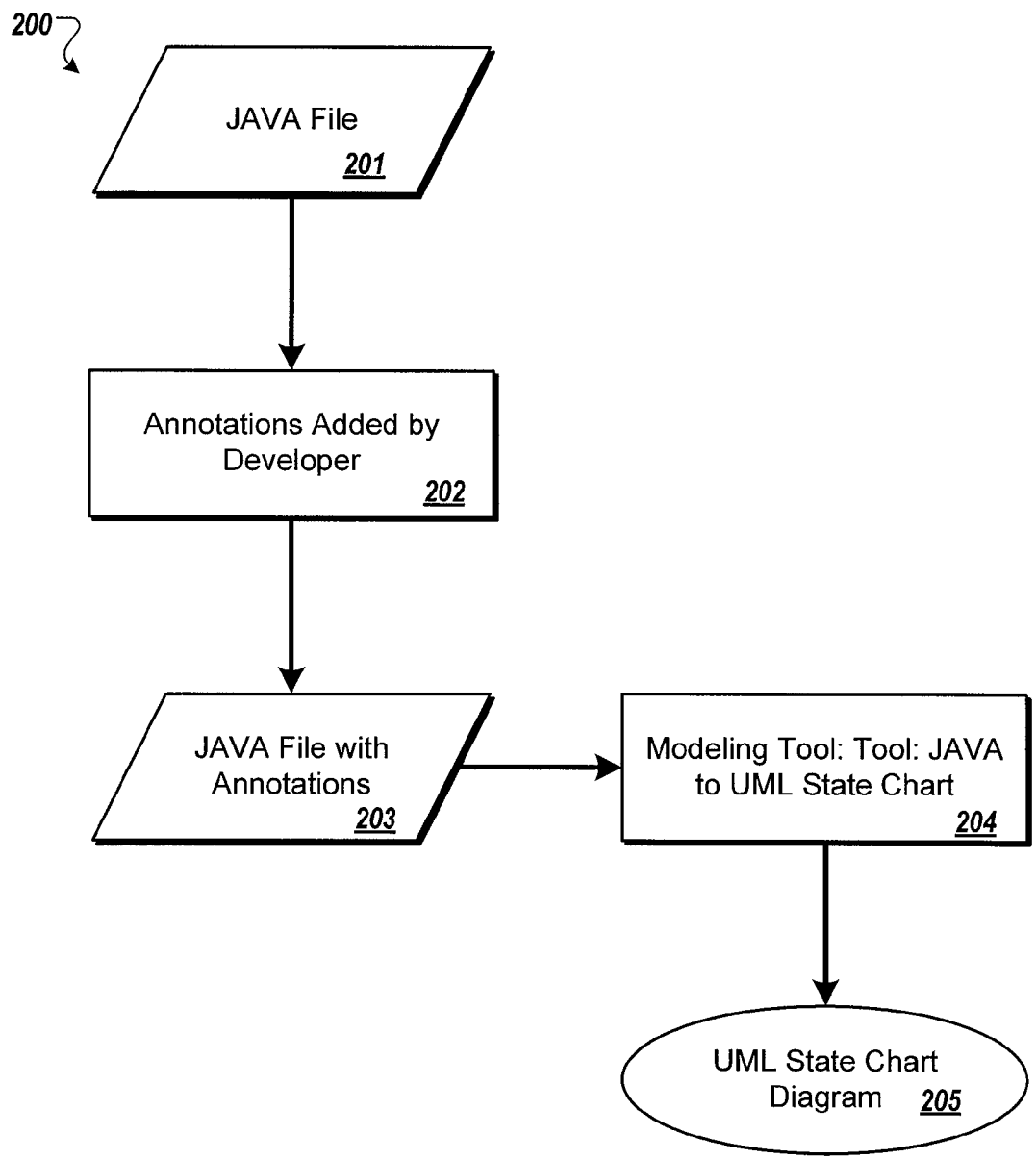
FIG. 2 is a schematic diagram depicting the workflow of an embodiment of a method for automatically creating a behavior pattern of a computer program for model-based testing techniques as described as one aspect of the present disclosure.

FIG. 2 is a schematic diagram which depicts a workflow of a method 200 for automatically creating a behavior pattern 205 based on a source code 201 of a computer program for model-based testing techniques. A source code 201 of a computer program comprises a plurality of program operations which are arranged in a logical succession. The source code 201 can be for example a JAVA file 201. This source code 201 is provided with annotations 202, which are added, for example automatically, semi-automatically or by a developer to the JAVA file 201. Thus, a JAVA file with annotations 203 is generated. Afterwards, a modeling tool 204 (as for example a "JAVA to UML state chart" converting tool) is applied to the JAVA file with annotations 203 in order to create automatically a UML state chart diagram 205. The modeling tool 204 parses the annotated source code 203, extracts the annotations appropriately from the annotated source code 203 and generates a behavior pattern of the computer program by arranging the annotations which have been read out according to the logical succession of the program operations. The modeling tool can provide this behavior pattern to an appropriate representing unit via suitable communication means. The behavior pattern can be, as already mentioned, a UML state chart diagram.

Figure 3:
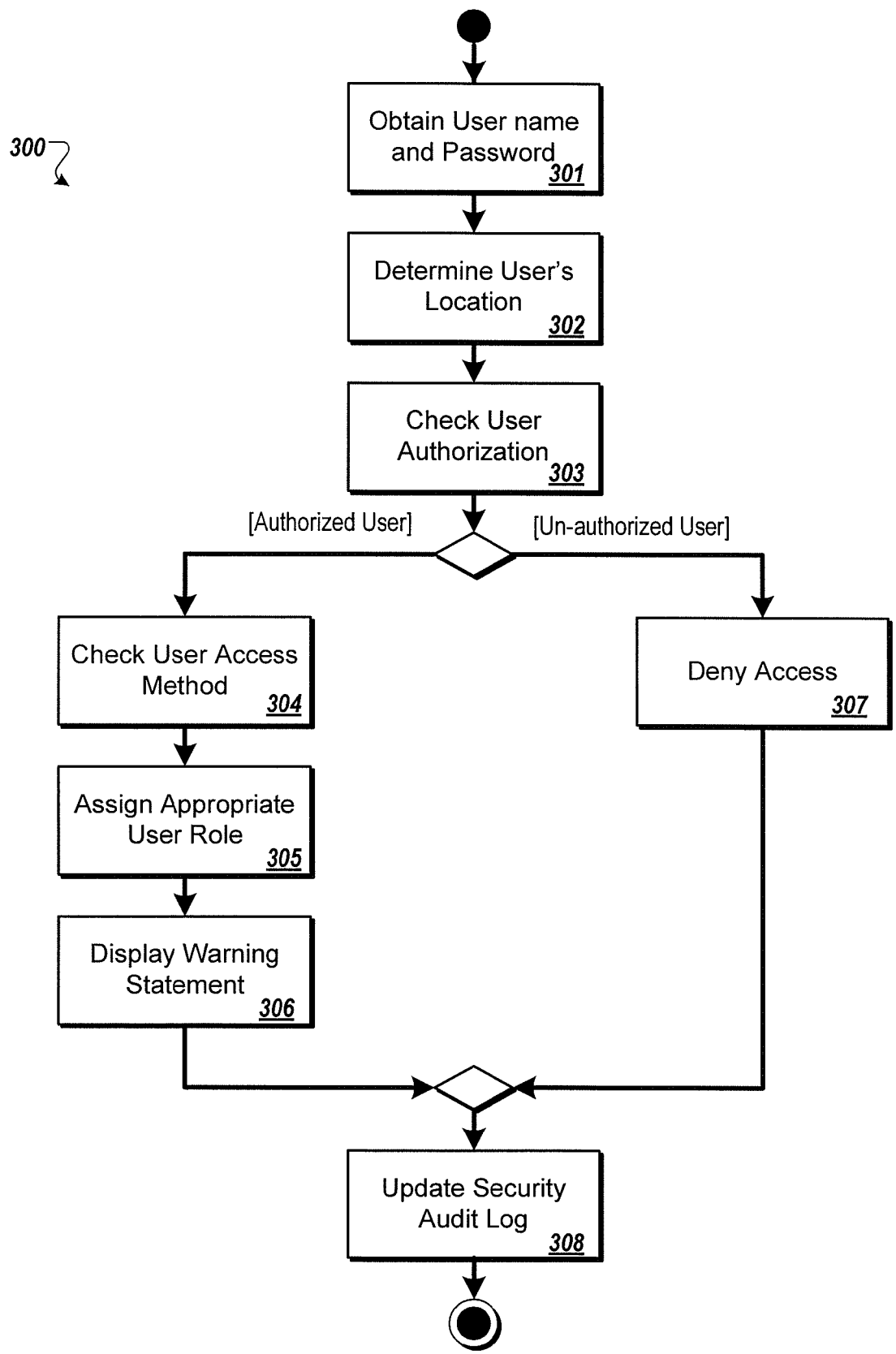
FIG. 3 is a schematic diagram which depicts a model of a login process as a state chart diagram.

FIG. 3 is a schematic diagram which depicts a model of a login process as a state chart diagram. The login process 300 comprises the operations of obtaining a name and a password of a user 301 and determining a location 302 of the user. Then, the operation of checking an authorization 303 of the user is performed. In case of an authorized user the following operations of checking the access method 304 of the user, assigning an appropriate user role 305 and displaying a warning statement 306 are performed. In the case of an un-authorized user the operation of denying access 307 is performed. In both cases, the login process is closed by updating a security audit log file 308.

Figure 4:
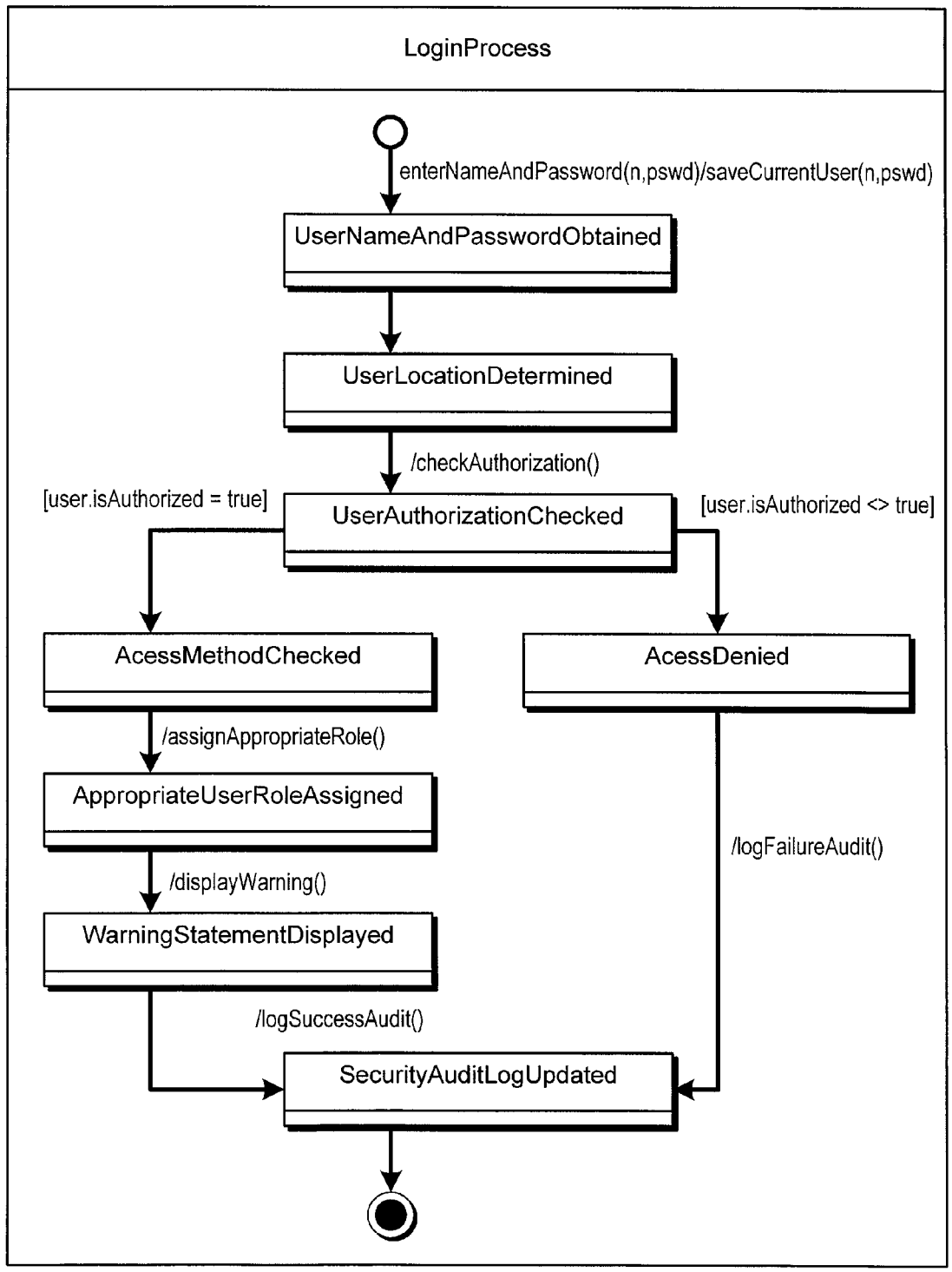
FIG. 4 is a schematic diagram which depicts a model of the login process depicted in FIG. 3, wherein the model is a dynamic UML state chart diagram which is generated by an industrial tool.

FIG. 4 is a schematic diagram which depicts a model of the login process as depicted in FIG. 3, wherein the model is a dynamic UML state chart diagram, which is generated by an industrial tool and shows the dynamic representation and behavior. The UML state chart diagram is designed manually using the industrial tool "Borland Together™" provided by Borland™.

Figure 5:
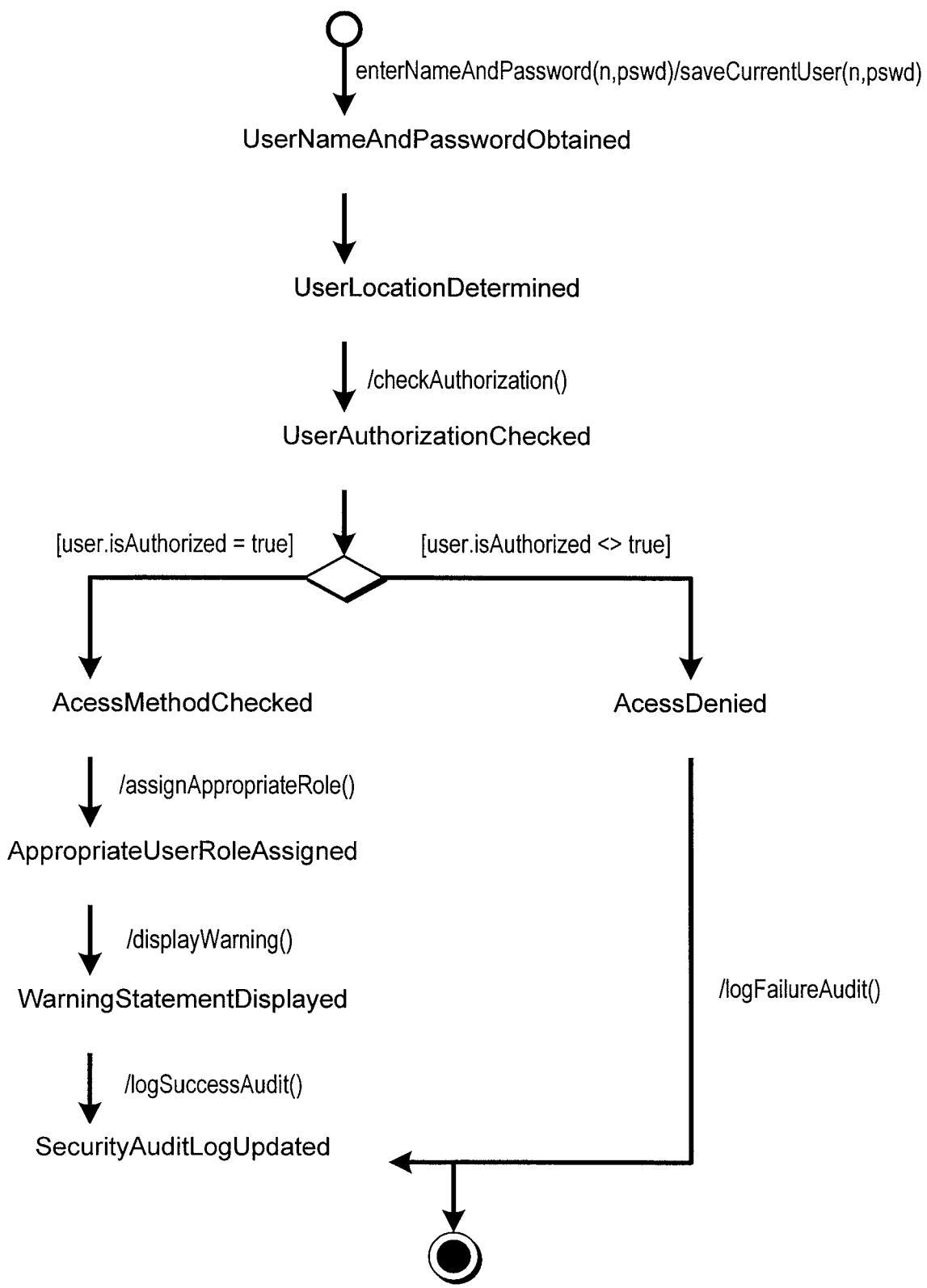
FIG. 5 is a schematic diagram which depicts a model of the login process depicted in FIGS. 3 and 4, wherein the model is a dynamic UML state chart diagram which is generated by a modeling tool which uses annotations from a source code according to the present description.

FIG. 5 is a schematic diagram which depicts a model of the login process as depicted in FIGS. 3 and 4, wherein the model is a dynamic UML state chart diagram, which is generated by a modeling tool according to the present description. The modeling tool automatically uses annotations from a source code representing the login process in order to generate the dynamic UML state chart diagram as shown in FIG. 2. FIG. 5 can be compared with FIG. 4. The model of FIG. 5 generated by using the annotations from the source code is similar to the model of FIG. 4, which has been designed manually using the industrial tool "Borland Together™". The modeling tool parses automatically the annotations added to the source code, generates a behavior pattern, here a UML state chart diagram by arranging the annotations according to a logical succession underlying the corresponding source code and provides the behavior pattern, for example for a visual representation.

It can be shown, that instead of directly creating a model visually, which is at all a time consuming operation, the model can also be created using a written way, which can be performed without efforts according to the present description. In case of industrial tools which are as shown in FIG. 4 visual/graphical tools, generally a lot of "clicks" and mouse applications are necessary. The written way achieves the same purpose in the perspective of model-based testing. Such an inline model enables more than just a different way of describing the model, but also of propagating the model. Such an inline approach is more accurate.

The description of the model by an inline approach as shown in FIG. 5 is less time consuming than the classical graphical way as shown in FIG. 4. Furthermore, this inline approach can also offer a graphical representation so that a collaborative work is still possible.

Furthermore, this approach offers the possibility to use the model at runtime of the underlying computer program. The model can also be animated in real time: Since Java is open source one way to achieve this would be to trace an execution call at the core of the JVM.

Figure 6:
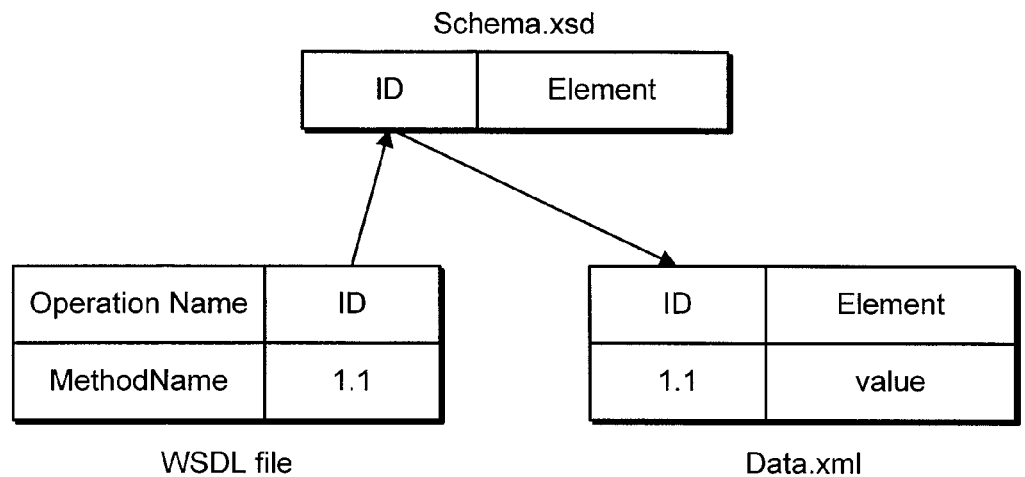
FIG. 6 is a schematic diagram depicting the references of a WDSL file, a schema file and a data file.

FIG. 6 is a schematic diagram depicting references of a WSDL file, an XML schema file and a data file. The WSDL file contains operation names and respective annotations which are stored in an XML data file. The XML data file is structured by the XML schema. By referencing the XML data file to the WSDL file, the annotations are available in the WSDL file.

Figure 7:
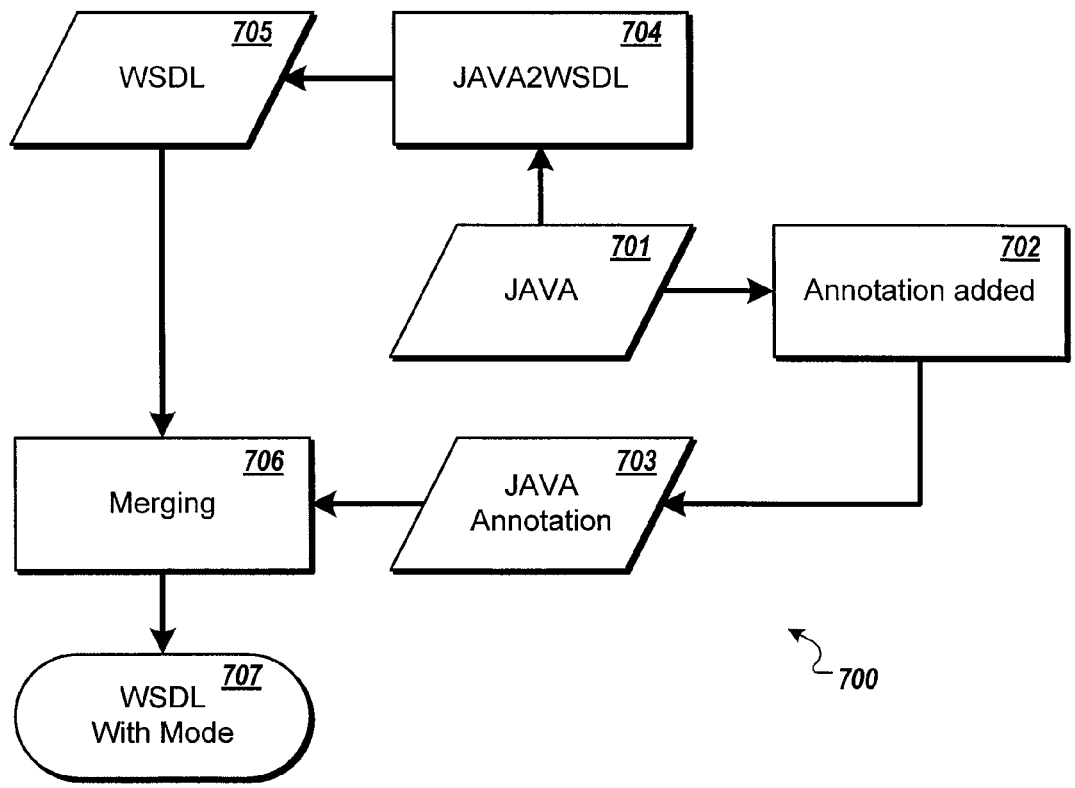
FIG. 7 is a schematic diagram depicting a process of merging annotations to a WDSL file.

FIG. 7 is a schematic diagram depicting a process 700 of merging annotations with a WDSL file. For merging the annotations with the WDSL file, a JAVA source code file 701 has to be prepared in two separate ways. In one way, annotations 702 are added to the original JAVA source code file 701 to create an annotated JAVA source code file 703. According to a second way, the original JAVA source code file 701 is transformed into a WSDL file 705 by using means 704 which are able to convert a JAVA file into a WSDL file. The WSDL file 705 is merged within a merging operation 706 with the annotated JAVA source code file 703 to create an annotated WSDL file 707, which can be utilized for example by the modeling tool to create a corresponding behavior pattern, as for example a UML state chart diagram of a web service which is represented by the WSDL file.

FIG. 8 is an extract of a JAVA source code being provided with annotations. In order to create a model of the source code of a computer program, annotations are added to the source code.

FIG. 9 is a schematic diagram showing an example of computer systems arranged in a computer network 900. Particularly, the network 900 here includes server devices 902A-C connected by any kind of computer network 904. For example, the server 902C can be used for creating a behavior pattern of a computer program. The server 902C includes a storage that holds a computer program 906 comprising at least one source code with a plurality of program operations arranged in a logical succession. The storage also holds annotations 908, each annotation referencing at least one of the program operations.

The server 902C includes a modeling tool configured to automatically read the annotations 908 and generate one or more behavior patterns 912. The behavior patter 912 is a behavior pattern of the computer program 906 and is generated by arranging the annotations 908 according to the logical succession of the program operations 906, the behavior pattern 912 configured to be represented using a representing unit 914, such as a display device.

In some implementations, the server device 902C can include an output function 916 for providing the behavior pattern to the representing unit 914. For example, the output function 916 can include any kind of connection to the representing unit 914, such as a user interface generated by the server 902C and provided to the representing unit 914 through any type of connector such as a VGA cable or a network connection.

In some implementations, any or all of the server devices 902A-C are configured to provide a local web service 918. For example, the modeling tool 910 can be configured to generate the behavior pattern(s) for the local web service(s) 918.

In some implementations, the modeling tool 910 can generate more than one behavior pattern 912. For example, the modeling tool can generate a superior behavior pattern 912 using the behavior patterns 912 of the respective local web services 918 of the respective servers 902.

Annex 1 is an extract of a source code of a web service being provided with annotations describing security states of the web service. In order to create a model of the source code of the web service, annotations are added to the source code.

Annex 2 is an extract of a source code of a WSDL file identified in FIG. 6. The source code of the WSDL file is obtained by an implementation of the references which are depicted in the schematic diagram of FIG. 6.

The approach described in this description, allows one to describe a model using an inline approach rather than the classical graphical way. This approach is less time consuming and can also offer a graphical representation so that the collaborative work is still possible. Moreover the model can be used in different domains: The model can be weaved in the WSDL file which enables Model-Based Testing of Web Services.

This approach offers the possibility to use the generated model at runtime. The model can also be animated in real time: Since Java is open source one way to achieve this would be to trace an execution call at the core of the JVM. One area where this approach can be extended is concerning the formal language OCL. OCL constraint can also be added into the data file but in the domain of web services WSDL-Semantic is already in place with pre- and post-condition for each operation. It can be interested to see how this approach can be combined with semantic WSDL.

ANNEX 1

```
package com.Instance.to.Source;
import com.Instance.to.annotation.*;
public interface LogIn {
    @StateChartAnnotation(id="1.1",status="UserNameAndPasswordObtained",previous="1.0",
true_Next="1.2",
        fault_Next="",true_Relation_Name="",false_Relation_Name="",Initial_Name="enter
NameAndPassword(n, pswd)/saveCurrentUser(n,pswd)")
    public void UserNameAndPasswordObtained( );
        @StateChartAnnotation(id="1.2",status="UserLocationDetermined",previous="1.1
",true_Next="1.3",
        fault_Next="",true_Relation_Name="/checkAuthorization( )",false_Relation_Name="",
Initial_Name="")
    public void UserLocationDetermined( );
        @StateChartAnnotation(id="1.3",status="UserAuthorizationChecked",previous="
1.2",true_Next="1.4",
        fault_Next="2.1",true_Relation_Name="[user.isAuthorized = true
]",false_Relation_Name="[user.isAuthorized <> true ]",Initial_Name="")
    public void UserAuthorizationChecked( );
        @StateChartAnnotation(id="1.4",status="AcessMethodChecked",previous="1.3",
true_Next="1.5",
        fault_Next="",true_Relation_Name="/assignAppropriateRole( )",false_Relation_Name="",
Initial_Name="")
    public void AcessMethodChecked( );
        @StateChartAnnotation(id="1.5",status="AppropriateUserRoleAssigned",previous="1.4",
true_Next="1.6",
        fault_Next="",true_Relation_Name="/displayWarning( )",false_Relation_Name="",
Initial_Name="")
    public void AppropriateUserRoleAssigned( );
        @StateChartAnnotation(id="1.6",status="WarningStatementDiplayed",previous=
"1.5",true_Next="1.7",
        fault_Next="",true_Relation_Name="/logSuccessAudit( )",false_Relation_Name=
"",Initial_Name="")
    public void WarningStatementDiplayed( );
        @StateChartAnnotation(id="1.7",status="SecurityAuditLogUpdated",previous="
1.6",true_Next="final",
        fault_Next="",true_Relation_Name="",false_Relation_Name="Invalid",Initial_Name="")
    public void SecurityAuditLogUpdated( );
@StateChartAnnotation(id="2.1",status="AcessDenied",previous="1.3",true_Next="1.7",
        fault_Next="",true_Relation_Name="/logFailureAudit( )",false_Relation_Name="
Invalid",Initial_Name="")
    public void AcessDenied( );
}
```

ANNEX 2

```
<?xml version="1.0" encoding="UTF-8" standalone="no"?>
<wsdl:definitions xmlns:wsdl="http://schemas.xmlsoap.org/wsdl/"
xmlns:Ap="http://localhost:8080/axis/services/login/Schema.xsd"
xmlns:apachesoap="http://xml.apache.org/xml-soap"
xmlns:impl="urn:com.Instance.to.Source.LogIn"
xmlns:intf="urn:com.Instance.to.Source.LogIn"
xmlns:soapenc="http://schemas.xmlsoap.org/soap/encoding/"
xmlns:wsdlsoap="http://schemas.xmlsoap.org/wsdl/soap/"
xmlns:xsd="http://www.w3.org/2001/XMLSchema"
targetNamespace="urn:com.Instance.to.Source.LogIn">
<!--WSDL created by Apache Axis version: 1.4
Built on Apr 22, 2006 (06:55:48 PDT)-->
   <wsdl:message name="AcessDeniedRequest">
   </wsdl:message>
   <wsdl:message name="AcessMethodCheckedRequest">
   </wsdl:message>
   <wsdl:message name="UserLocationDeterminedResponse">
   </wsdl:message>
   <wsdl:message name="UserNameAndPasswordObtainedResponse">
   </wsdl:message>
   <wsdl:message name="WarningStatementDiplayedRequest">
   </wsdl:message>
   <wsdl:message name="UserNameAndPasswordObtainedRequest">
   </wsdl:message>
   <wsdl:message name="AcessDeniedResponse">
   </wsdl:message>
   <wsdl:message name="UserAuthorizationCheckedRequest">
   </wsdl:message>
   <wsdl:message name="WarningStatementDiplayedResponse">
   </wsdl:message>
   <wsdl:message name="SecurityAuditLogUpdatedRequest">
   </wsdl:message>
   <wsdl:message name="UserAuthorizationCheckedResponse">
   </wsdl:message>
   <wsdl:message name="AppropriateUserRoleAssignedResponse">
   </wsdl:message>
   <wsdl:message name="UserLocationDeterminedRequest">
   </wsdl:message>
   <wsdl:message name="AcessMethodCheckedResponse">
   </wsdl:message>
   <wsdl:message name="AppropriateUserRoleAssignedRequest">
   </wsdl:message>
   <wsdl:message name="SecurityAuditLogUpdatedResponse">
   </wsdl:message>
   <wsdl:portType name="LogIn">
      <wsdl:operation name="UserNameAndPasswordObtained">
         <wsdl:input
message="impl:UserNameAndPasswordObtainedRequest"
name="UserNameAndPasswordObtainedRequest"/>
         <wsdl:output
message="impl:UserNameAndPasswordObtainedResponse"
name="UserNameAndPasswordObtainedResponse"/>
         <Ap:Annotation id="1.1"/></wsdl:operation>
      <wsdl:operation name="UserLocationDetermined">
         <wsdl:input message="impl:UserLocationDeterminedRequest"
name="UserLocationDeterminedRequest"/>
         <wsdl:output message="impl:UserLocationDeterminedResponse"
name="UserLocationDeterminedResponse"/>
         <Ap:Annotation id="1.2"/></wsdl:operation>
      <wsdl:operation name="UserAuthorizationChecked">
         <wsdl:input message="impl:UserAuthorizationCheckedRequest"
name="UserAuthorizationCheckedRequest"/>
         <wsdl:output message="impl:UserAuthorizationCheckedResponse"
name="UserAuthorizationCheckedResponse"/>
         <Ap:Annotation id="1.3"/></wsdl:operation>
      <wsdl:operation name="AcessMethodChecked">
         <wsdl:input message="impl:AcessMethodCheckedRequest"
name="AcessMethodCheckedRequest"/>
         <wsdl:output message="impl:AcessMethodCheckedResponse"
name="AcessMethodCheckedResponse"/>
         <Ap:Annotation id="1.4"/></wsdl:operation>
      <wsdl:operation name="AppropriateUserRoleAssigned">
         <wsdl:input
message="impl:AppropriateUserRoleAssignedRequest"
name="AppropriateUserRoleAssignedRequest"/>
         <wsdl:output
message="impl:AppropriateUserRoleAssignedResponse"
name="AppropriateUserRoleAssignedResponse"/>
```

```
            <Ap:Annotation id="1.5"/></wsdl:operation>
        <wsdl:operation name="WarningStatementDiplayed">
            <wsdl:input message="impl:WarningStatementDiplayedRequest"
name="WarningStatementDiplayedRequest"/>
            <wsdl:output message="impl:WarningStatementDiplayedResponse"
name="WarningStatementDiplayedResponse"/>
            <Ap:Annotation id="1.6"/></wsdl:operation>
        <wsdl:operation name="SecurityAuditLogUpdated">
            <wsdl:input message="impl:SecurityAuditLogUpdatedRequest"
name="SecurityAuditLogUpdatedRequest"/>
            <wsdl:output message="impl:SecurityAuditLogUpdatedResponse"
name="SecurityAuditLogUpdatedResponse"/>
            <Ap:Annotation id="1.7"/></wsdl:operation>
        <wsdl:operation name="AcessDenied">
            <wsdl:input message="impl:AcessDeniedRequest" name="AcessDeniedRequest"/>
            <wsdl:output message="impl:AcessDeniedResponse"
name="AcessDeniedResponse"/>
            <Ap:Annotation id="2.1"/></wsdl:operation>
    </wsdl:portType>
    <wsdl:binding name="LogInSoapBinding" type="impl:LogIn">
        <wsdlsoap:binding style="rpc" transport="http://schemas.xmlsoap.org/soap/http"/>
        <wsdl:operation name="UserNameAndPasswordObtained">
            <wsdlsoap:operation soapAction=""/>
            <wsdl:input name="UserNameAndPasswordObtainedRequest">
                <wsdlsoap:body encodingStyle="http://schemas.xmlsoap.org/soap/encoding/"
namespace="urn:com.Instance.to.Source.LogIn" use="encoded"/>
            </wsdl:input>
            <wsdl:output name="UserNameAndPasswordObtainedResponse">
                <wsdlsoap:body encodingStyle="http://schemas.xmlsoap.org/soap/encoding/"
namespace="urn:com.Instance.to.Source.LogIn" use="encoded"/>
            </wsdl:output>
        </wsdl:operation>
        <wsdl:operation name="UserLocationDetermined">
            <wsdlsoap:operation soapAction=""/>
            <wsdl:input name="UserLocationDeterminedRequest">
                <wsdlsoap:body encodingStyle="http://schemas.xmlsoap.org/soap/encoding/"
namespace="urn:com.Instance.to.Source.LogIn" use="encoded"/>
            </wsdl:input>
            <wsdl:output name="UserLocationDeterminedResponse">
                <wsdlsoap:body encodingStyle="http://schemas.xmlsoap.org/soap/encoding/"
namespace="urn:com.Instance.to.Source.LogIn" use="encoded"/>
            </wsdl:output>
        </wsdl:operation>
        <wsdl:operation name="UserAuthorizationChecked">
            <wsdlsoap:operation soapAction=""/>
            <wsdl:input name="UserAuthorizationCheckedRequest">
                <wsdlsoap:body encodingStyle="http://schemas.xmlsoap.org/soap/encoding/"
namespace="urn:com.Instance.to.Source.LogIn" use="encoded"/>
            </wsdl:input>
            <wsdl:output name="UserAuthorizationCheckedResponse">
                <wsdlsoap:body encodingStyle="http://schemas.xmlsoap.org/soap/encoding/"
namespace="urn:com.Instance.to.Source.LogIn" use="encoded"/>
            </wsdl:output>
        </wsdl:operation>
        <wsdl:operation name="AcessMethodChecked">
            <wsdlsoap:operation soapAction=""/>
            <wsdl:input name="AcessMethodCheckedRequest">
                <wsdlsoap:body encodingStyle="http://schemas.xmlsoap.org/soap/encoding/"
namespace="urn:com.Instance.to.Source.LogIn" use="encoded"/>
            </wsdl:input>
            <wsdl:output name="AcessMethodCheckedResponse">
                <wsdlsoap:body encodingStyle="http://schemas.xmlsoap.org/soap/encoding/"
namespace="urn:com.Instance.to.Source.LogIn" use="encoded"/>
            </wsdl:output>
        </wsdl:operation>
        <wsdl:operation name="AppropriateUserRoleAssigned">
            <wsdlsoap:operation soapAction=""/>
            <wsdl:input name="AppropriateUserRoleAssignedRequest">
                <wsdlsoap:body encodingStyle="http://schemas.xmlsoap.org/soap/encoding/"
namespace="urn:com.Instance.to.Source.LogIn" use="encoded"/>
            </wsdl:input>
            <wsdl:output name="AppropriateUserRoleAssignedResponse">
                <wsdlsoap:body encodingStyle="http://schemas.xmlsoap.org/soap/encoding/"
namespace="urn:com.Instance.to.Source.LogIn" use="encoded"/>
            </wsdl:output>
        </wsdl:operation>
        <wsdl:operation name="WarningStatementDiplayed">
            <wsdlsoap:operation soapAction=""/>
            <wsdl:input name="WarningStatementDiplayedRequest">
                <wsdlsoap:body encodingStyle="http://schemas.xmlsoap.org/soap/encoding/"
```

```
namespace="urn:com.Instance.to.Source.LogIn" use="encoded"/>
      </wsdl:input>
      <wsdl:output name="WarningStatementDiplayedResponse">
         <wsdlsoap:body encodingStyle="http://schemas.xmlsoap.org/soap/encoding/"
namespace="urn:com.Instance.to.Source.LogIn" use="encoded"/>
      </wsdl:output>
   </wsdl:operation>
   <wsdl:operation name="SecurityAuditLogUpdated">
      <wsdlsoap:operation soapAction=""/>
      <wsdl:input name="SecurityAuditLogUpdatedRequest">
         <wsdlsoap:body encodingStyle="http://schemas.xmlsoap.org/soap/encoding/"
namespace="urn:com.Instance.to.Source.LogIn" use="encoded"/>
      </wsdl:input>
      <wsdl:output name="SecurityAuditLogUpdatedResponse">
         <wsdlsoap:body encodingStyle="http://schemas.xmlsoap.org/soap/encoding/"
namespace="urn:com.Instance.to.Source.LogIn" use="encoded"/>
      </wsdl:output>
   </wsdl:operation>
   <wsdl:operation name="AcessDenied">
      <wsdlsoap:operation soapAction=""/>
      <wsdl:input name="AcessDeniedRequest">
         <wsdlsoap:body encodingStyle="http://schemas.xmlsoap.org/soap/encoding/"
namespace="urn:com.Instance.to.Source.LogIn" use="encoded"/>
      </wsdl:input>
      <wsdl:output name="AcessDeniedResponse">
         <wsdlsoap:body encodingStyle="http://schemas.xmlsoap.org/soap/encoding/"
namespace="urn:com.Instance.to.Source.LogIn" use="encoded"/>
      </wsdl:output>
   </wsdl:operation>
</wsdl:binding>
<wsdl:service name="LogInService">
   <wsdl:port binding="impl:LogInSoapBinding" name="LogIn">
      <wsdlsoap:address location="http://localhost:8080/axis/services/LogIn"/>
   </wsdl:port>
</wsdl:service>
</wsdl:definitions>
```

The invention claimed is:

1. A computer-implemented method for creating a behavior pattern of a computer program, the method comprising:
analyzing a computer program comprising at least one source code with a plurality of program operations arranged in a logical succession, the computer program comprising a web service and the program operations comprising web service operations;
inferring annotations based on the analysis to define inferred annotations, each inferred annotation referencing at least one of the web service operations;
adding the inferred annotations to the computer program to define an annotated computer program;
reading the inferred annotations in the annotated computer program;
generating a dynamic state chart diagram of the annotated computer program based on the inferred annotations by arranging the inferred annotations according to the logical succession of the program operations, the dynamic state chart diagram representing the behavior pattern; and
providing the dynamic state chart diagram to a representing unit, the dynamic state chart diagram configured to be represented using the representing unit.

2. The method according to claim 1, wherein at least a part of the logical succession comprises a chronological succession.

3. The method according to claim 1, wherein the dynamic state chart diagram comprises at least one finite state machine.

4. The method according to claim 1, wherein at least one of the inferred annotations comprises a definition of states and behavior of the annotated computer program according to the corresponding program operation.

5. The method according to claim 1, wherein the dynamic state chart diagram is a Unified Modeling Language (UML) state chart diagram.

6. The method according to claim 1, wherein the dynamic state chart diagram is configured for at least one of: (a) analyzing and testing the computer program and (b) performing model-based-testing techniques (MBT).

7. The method according to claim 1, wherein the web service has a decentralized structure comprising a plurality of local web services, and wherein generating the dynamic state chart diagram further comprises:
generating at least one dynamic state chart diagram for at least one of the local web services.

8. The method according to claim 7, further comprising:
generating a superior dynamic state chart diagram using the at least one dynamic state chart diagram generated for the at least one respective local web service of the plurality of local web services.

9. The method according to claim 1, wherein the at least one source code is a JAVA source code.

10. A server for creating a behavior pattern of a computer program, the server comprising:
a storage that holds a computer program comprising at least one source code with a plurality of program operations arranged in a logical succession, the computer program comprising a web service and the program operations comprising web service operations, wherein the server performs the operations of:
analyzing the computer program;
inferring annotations based on the analysis to define inferred annotations, each inferred annotation referencing at least one of the web service operations, the storage holding the inferred annotations;

adding the inferred annotations to the computer program to define an annotated computer program; and a modeling tool configured to automatically read the inferred annotations and generate a dynamic state chart diagram of the annotated computer program based on the inferred annotations by arranging the inferred annotations according to the logical succession of the program operations, the dynamic state chart diagram representing the behavior pattern and being configured to be represented using a representing unit.

11. The server according to claim 10, further comprising:

means for providing the dynamic state chart diagram to the representing unit.

12. A network system comprising:

a storage that holds a web service comprising at least one source code with a plurality of web service operations arranged in a logical succession, wherein the server performs the operations of:

analyzing the web service;

inferring annotations based on the analysis to define inferred annotations, each inferred annotation referencing at least one of the web service operations, the storage holding the inferred annotations;

adding the inferred annotations to the web service to define an annotated web service; and a modeling tool running on a processing unit and configured to automatically read the inferred annotations and generate a dynamic state chart diagram of the annotated web service based on the inferred annotations by arranging the inferred annotations according to the logical succession of the web service operations, the dynamic state chart diagram representing behavior pattern and being configured to be represented using a representing unit.

13. The network system according claim 12, wherein the modeling tool generates a superior dynamic state chart diagram using the dynamic state chart diagram of the respective local web services of the respective servers.

14. A computer program product tangibly embodied in a non-transitory computer-readable storage medium and comprising instructions that when executed by a processor perform a method for creating a dynamic state chart diagram of a computer program, the method comprising:

analyzing a computer program comprising at least one source code with a plurality of program operations arranged in a logical succession, the computer program comprising a web service and the program operations comprising web service operations;

inferring annotations based on the analysis to define inferred annotations, each inferred annotation referencing at least one of the web service operations;

adding the inferred annotations to the computer program to define an annotated computer program;

reading the inferred annotations in the annotated computer program;

generating a dynamic state chart diagram of the annotated computer program based on the inferred annotations by arranging the inferred annotations according to the logical succession of the program operations; and providing the dynamic state chart diagram to a representing unit, the dynamic state chart diagram representing the behavior pattern and being configured to be represented using the representing unit.

\* \* \* \* \*